United States Patent

Seron

[11] 4,136,934
[45] Jan. 30, 1979

[54] EYEGLASS HOLDER

[75] Inventor: Suren V. Seron, Joliet, Ill.

[73] Assignee: Seron Manufacturing Company, Joliet, Ill.

[21] Appl. No.: 815,538

[22] Filed: Jul. 14, 1977

[51] Int. Cl.² .................................................. G02C 3/00
[52] U.S. Cl. ...................................... 351/157; 24/3 C
[58] Field of Search ..................... 351/123, 156, 157; 24/3 C, 73 SA, 81 AD

[56] References Cited

U.S. PATENT DOCUMENTS

| 2,819,650 | 1/1958 | Seron | 351/156 |
| 2,858,733 | 11/1958 | Lodewick et al. | 351/157 X |
| 3,979,795 | 9/1976 | Seron | 35/157 X |

Primary Examiner—Paul A. Sacher
Attorney, Agent, or Firm—Wegner, Stellman, McCord, Wiles & Wood

[57] ABSTRACT

An eyeglass holder having an elongated, flexible band terminated in opposed ends each having eyeglass receiving and holding fixtures, the fixtures comprising unitary elastomeric molded parts having disc-like portions and integral tail-like projections extending therefrom, the projections being considerably thicker than the disc-like portions and having elongated, temple-receiving, closed ended slots extending along the majority of the length of the projections, the end of the slot nearest the disc-like portions being spaced therefrom.

5 Claims, 5 Drawing Figures

U.S. Patent      Jan. 30, 1979      4,136,934
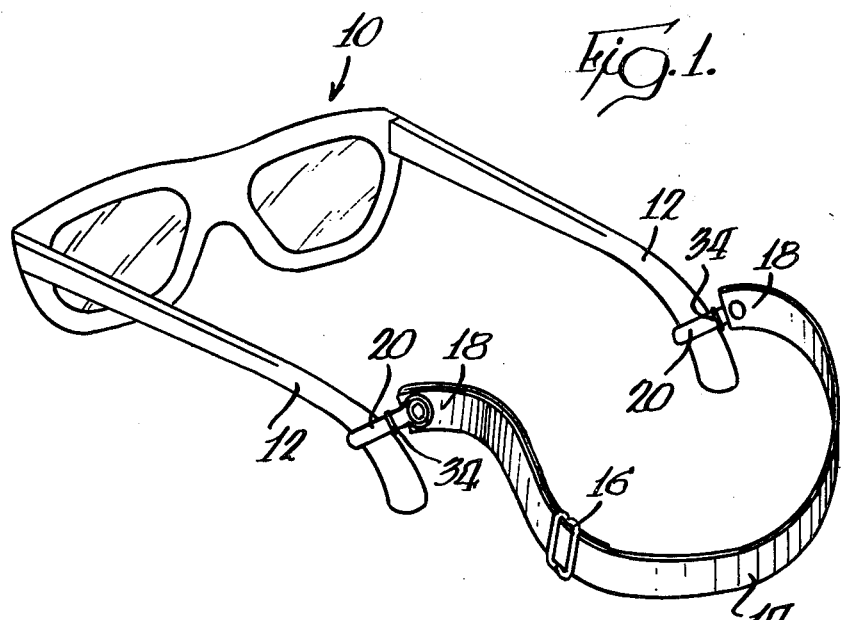
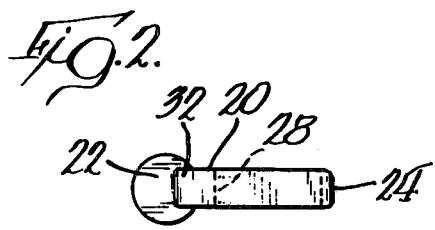
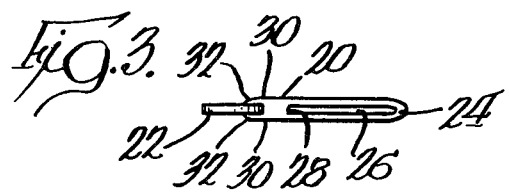
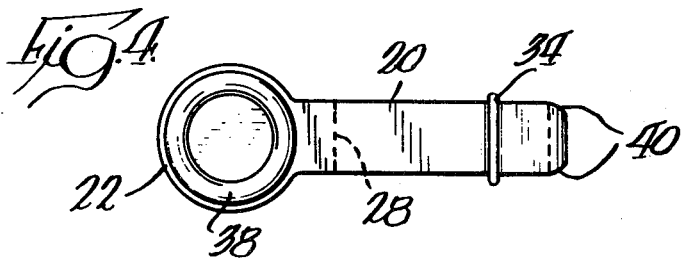
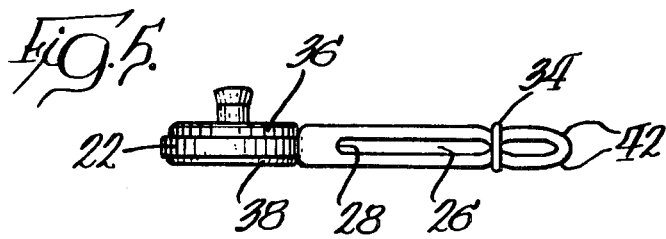

EYEGLASS HOLDER

BACKGROUND OF THE INVENTION

This invention relates to eyeglass holders and, more particularly, to improved eyeglass temple receiving and holding fixtures used on eyeglass holders.

With the ever increasing use of eyeglasses, there has been a commensurate increase in the use of eyeglass holders for holding the glasses on the head of the wearer or for retaining the glasses suspended from the neck of the user of the eyeglasses.

A typical eyeglass holder is comprised of a flexible, elongated strap which may or may not be elastic and which, at both its ends, mounts eyeglass temple receiving and holding fixtures. In some cases, the fixtures are made adjustable so as to receive and hold temples of varying sizes. In some instances, the fixtures are formed separately from the strap, while in others, they are an integral part thereof, most often when the entire holder is a molded product.

Many of the molded products in use today are undesirable in that when placed on glasses, the end of the fixture receiving the temple tends to poke into the head of the wearer. Similarly, many of the eyeglass holders using fixtures separate from the strap are undesirable in that they may be difficult to manufacture and/or they do not firmly grip the temple of the eyeglass.

SUMMARY OF THE INVENTION

It is the principal object of the invention to provide a new and improved eyeglass holder. More specifically, it is an object of the invention to provide a new and improved eyeglass temple-receiving and holding fixture for use with eyeglass holders.

An exemplary embodiment of the invention achieves the foregoing object in an eyeglass holder having an elongated flexible band terminating in opposed ends, each having eyeglass temple-receiving and holding fixtures thereon. According to the invention, there is utilized an improved fixture which comprises a unitary, elastomeric, molded part having a disc-like portion and an integral tail-like projection extending therefrom. An elongated slot is disposed in the projection.

In a highly preferred embodiment, the projection is considerably thicker than the disc-like portion and the slot extends along the majority of the length of the projection with the end of the slot nearest the disc-like portion being spaced therefrom.

A highly preferred embodiment of the invention also contemplates that the sides of the projection adjacent the disc-like portion taper inwardly from about the edge of the disc-like portion to the thickness of the disc-like portion at a point well short of the center thereof.

Preferably, the slot is substantially coplanar with the disc-like portion and, in a highly preferred embodiment, the fixture is symmetrical about the longitudinal axis of the projection so that it may be used on either end of the strap with equal facility and without concern for proper orientation thereon during assembly.

Other objects and advantages will become apparent from the following specification taken in connection with the accompanying drawings.

DESCRIPTION OF THE DRAWINGS

FIG. 1 is a perspective view of a pair of eyeglasses having assembled thereto an eyeglass holder made according to the invention;

FIG. 2 is an elevational view of a fixture made according to the invention;

FIG. 3 is a plan view of the fixture;

FIG. 4 is an enlarged view of the fixture similar to FIG. 2, but illustrating the application of a securing means applied to the fixture along with an adjusting device; and FIG. 5 is a view of the fixture similar to FIG. 3 but with the components illustrated in FIG. 4 assembled thereto.

DESCRIPTION OF THE PREFERRED EMBODIMENT

An exemplary embodiment of an eyeglass holder made according to the invention is illustrated in FIG. 1 in connection with a pair of eyeglasses, generally designated 10, having temples 12. The eyeglass holder consists of an elongated, flexible band or strap 14 which may be elastic if intended to be used only for retaining the glasses on the head of the wearer. Conventional means, including a buckle 16, are utilized for adjusting the length of the band 14.

The ends 18 of the strap or band 14 mount eyeglass temple receiving and holding fixtures 20. Preferably, at each end 18 there is provided a female snap connector of conventional construction for use in securing the fixtures 20 thereto.

Referring to FIGS. 2 and 3, each of the fixtures 20 is defined by a disc-like portion 22 which, as illustrated, is circular, and an integral, tail-like projection 24 extending therefrom. The fixtures 20 preferably are molded out of any suitable elastomer. The projection 24 has elongated slot 26 therein for receipt of one of the temples 12. It is to be observed that the slot 26 is closed ended and the end 28 nearest the disc-like portion 22 terminates at a location spaced from the disc-like portion 22. In a typical instance, the spacing will be on the order of ⅛ inch.

As best seen in FIG. 3, the sides 30 of the projection taper inwardly as at 32 from about the edge of the disc-like portion 22 to a point well short of the center 34 of the disc-like portion 22. FIG. 3 also illustrates that the slot 26 is coplanar with the disc-like portion and projection 24 is considerably thicker than the disc-like portion 22. It will also be seen that the fixture 22 is symmetrical about the longitudinal axis of the projection 24 so that the same part can be used as the fixture on either end of the strap 14 without regard as to whether the right or left temple 12 of the eyeglass is to be held thereby.

A small wire band 34 is applied to the projection 24 and is sized so as to substantially close the slot 26 at its location on the projection 24. By adjusting the position of the band 34, the effective length of the slot 26 may be varied to thereby adjust its size so as to provide tight gripping for any of a wide variety of differing size temples 12.

As seen in FIGS. 4 and 5, a male snap connector 36 of conventional construction has been secured to one side of the disc-like portion 22 by means of a conventional, penetrating locking ring 38. Thus, the fixture 20 may be easily assembled to the female snap connector on the strap 14.

Of considerable consequence to the present invention is the fact that the end 28 of the slot 26 terminates well short of the disc-like portion 22 and the presence of the blended or tapered sides 32 of the projection to the disc-like portion 22 in the manner mentioned previously. It has been determined by the applicant that such a construction is ideally suited for withstanding the localized stresses present at the interface of the projection 24 and the disc-like portion 22 which have prevented successful use of fixtures such as that of the present invention due to premature failure caused by such stresses.

The end of the projection 24 is generously rounded as at 40 (FIG. 4) and 42 (FIG. 5) to allow easy assembly of the band 34 to the projection 24 and to provide a structure free of corners which might poke into the head of the wearer or otherwise cause discomfort.

From the foregoing, it will be appreciated that an eyeglass holder made according to the invention is simply and economically manufactured and will reliably hold glasses having temples of a wide variety of sizes. It will also be appreciated that when the fixture 20 is secured to the band 14 such that the plane of the disc-like portion 22, and thus the slot 26, is essentially coplanar with the plane of the band 14 if straightened, there will be no tendency of the end of the projection 24 to poke into the head of the wearer.

An eyeglass holder made according to the present invention possesses substantial other advantages over similar holders using bent plastic tubing in forming the fasteners. In such prior art holders, the tubing is bent in half and then inserted in a machine which places the male snap fastener on the tubing to form a closed ended loop. The bend in the tubing generates a constant stretch or strain which occasionally fails due to the continuous nature of the stress thus imposed at the bend. The molded fastener of the present invention is totally lacking in molecular stress points which could crack or fail if stored or used over long periods of time.

Moreover, in holders using tubing-type fasteners, since the tubing is normally extruded, the molecular structure is less dense than that present in the molded fastener of the present invention. Thus, the fastener of the present invention is considerably stronger and less subject to distortion or tearing.

The configuration of a fastener made according to the invention lends itself to automatic assembly techniques, minimizing labor costs since the uniformity of its configuration lends itself to exact guide placement.

I claim:

1. In an eyeglass holder having an elongated, flexible band terminating in opposed ends each having eyeglass temple-receiving and holding fixtures thereon, the improvement wherein each said fixture comprises a unitary elastomeric molded part having a disc-like portion and an integral, tail-like projection extending therefrom, said projection being considerably thicker than said disc-like portion and having an elongated temple-receiving closed ended slot extending along a majority of the length of said projection, the end of the slot nearest said disc-like portion being spaced therefrom.

2. The eyeglass holder of claim 1 wherein said fixture is symmetrical about the longitudinal axis of said projection.

3. In an eyeglass holder having an elongated, flexible band terminating in opposed ends each having eyeglass temple-receiving and holding fixtures thereon, the improvement wherein each said fixture comprises a unitary elastomeric molded part having a disc-like portion and an integral, tail-like projection extending therefrom, said projection being considerably thicker than said disc-like portion and having an elongated, temple-receiving closed ended slot extending along a majority of the length of said projection, the end of the slot nearest said disc-like portion being spaced therefrom, the sides of said projection adjacent said disc-like portion tapering inwardly from about the edge of said disc-like portion to the thickness of said disc-like portion at a point well short of the center thereof.

4. In an eyeglass holder having an elongated, flexible band terminating in opposed ends each having eyeglass temple-receiving and holding fixtures thereon, the improvement wherein each said fixture comprises a unitary elastomeric molded part having a disc-like portion and an integral, tail-like projection extending therefrom, said projection being considerably thicker than said disc-like portion and having an elongated temple-receiving closed ended slot extending along a majority of the length of said projection, the end of the slot nearest said disc-like portion being spaced therefrom, said slot being substantially coplanar with said disc-like portion.

5. In an eyeglass holder having an elongated, flexible band terminating in opposed ends each having eyeglass temple-receiving and holding fixtures thereon, the improvement wherein each said fixture comprises a unitary elastomeric molded part having a disc-like portion and an integral, tail-like projection extending therefrom, and an elongated slot in said projection.

* * * * *